United States Patent Office 2,884,490

Patented Apr. 28, 1959

2,884,490

TELEPHONE INTERCOMMUNICATION SYSTEM

Fritz Trachsel, Bern, Switzerland

Application September 12, 1956, Serial No. 609,496

6 Claims. (Cl. 179—18)

The present invention relates to a telephone intercommunication system of the kind having between an exchange and a number of distant subscribers' stations a smaller number of electric junction paths. Between the subscribers' stations and one end of the junction paths there is a first automatic switch apparatus, and between the other end of the junctions paths and the connections of the exchange associated with the separate subscribers there is a second switch apparatus. The two apparatuses automatically switch-through a called or calling subscriber's station with the respective exchange connection over one of the free, i.e. not engaged junction paths.

As opposed to known telephone intercommunication systems of the kind, the one according to the present invention is distinguished in that each of said switch apparatuses includes a pendulum commutator with a freely oscillating tunable pendulum adapted to synchronously control the contact means of the switch apparatus. Thus a comparatively simple design of the apparatus is made possible and a special control circuit between the two apparatuses can be dispensed with which, in certain cases, may be of considerable advantage.

Further features of the invention will appear from the following description and claims, taken in conjunction with the accompanying drawing, wherein there is shown by way of example one simplified embodiment of the object of invention, all details unnecessary for a better understanding of same being omitted.

Figure 1:
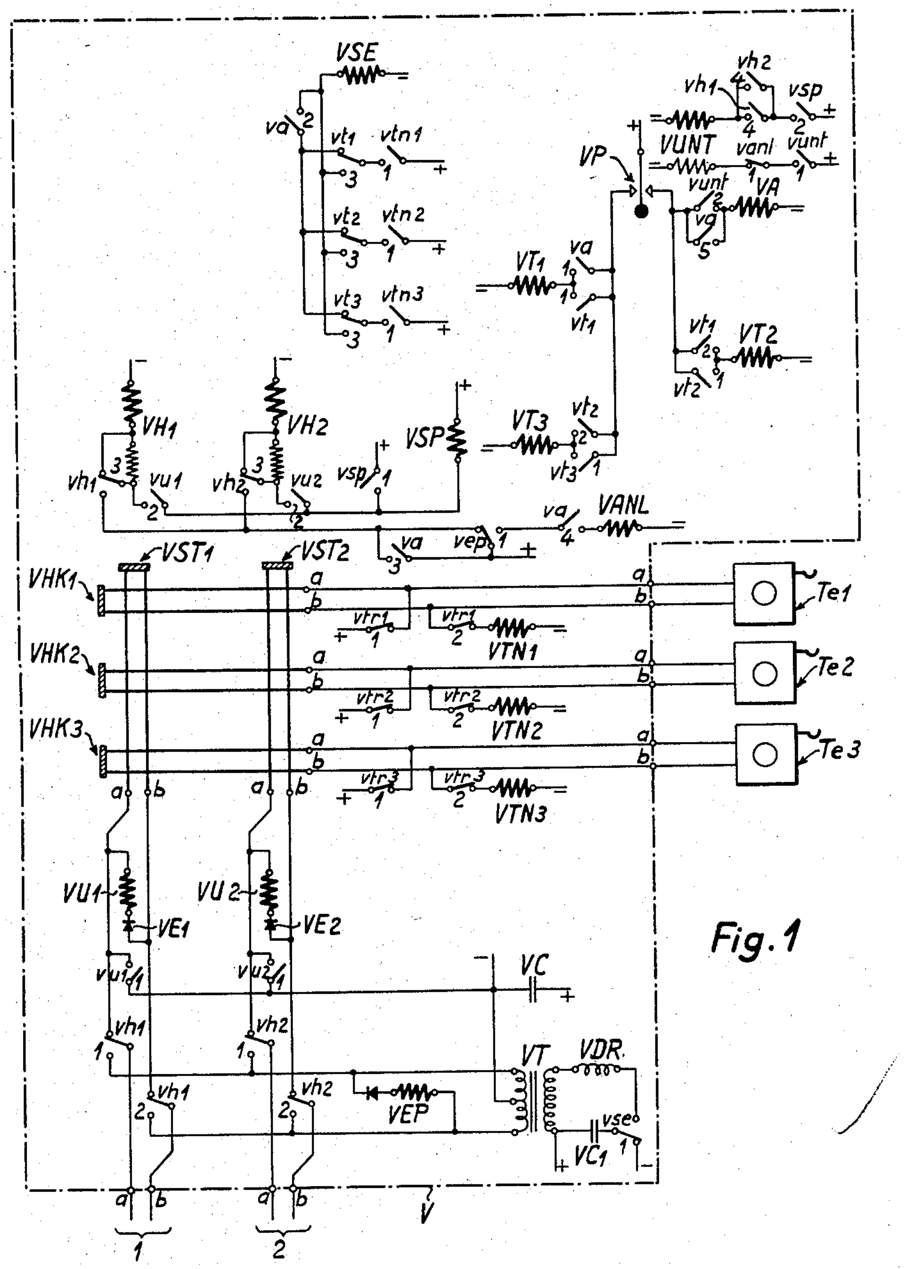
Fig. 1 shows diagrammatically three subscribers' stations and one switch apparatus for automatically connecting them to two junction lines.
Figure 2:
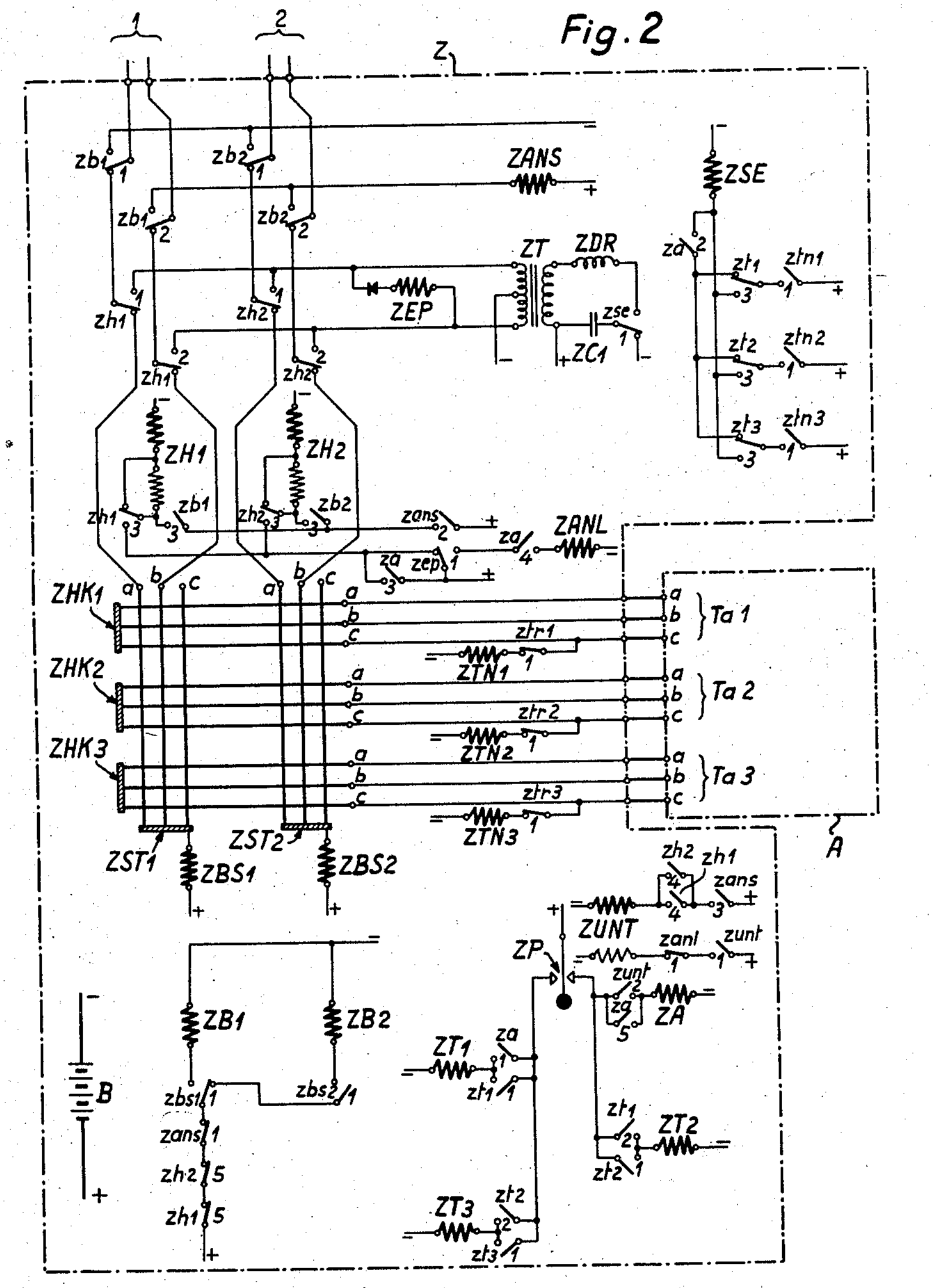
Fig. 2 shows diagrammatically the second switch apparatus for automatically connecting the junction lines to the connections of an exchange associated with the separate subscribers' stations.

According to Fig. 1, each of the three subscribers' stations T*e*1, T*e*2 and T*e*3 is connected through a two-wire circuit to an electric switch apparatus V located at a site distant from a telephone exchange A (Fig. 2). For each of the subscribers' stations the exchange A has a connection T*a*1, T*a*2 and T*a*3 respectively, which is joined to a second switch apparatus Z located at the same site as the exchange A. Between the two apparatuses V and Z there are some electric junction paths 1, 2, in the present instance two-wire lines which in number are fewer than that of the subscribers' stations T*e*1, T*e*2 and T*e*3.

The switch apparatus V includes as most important contact means a cross-bar switch having two vertical switch rods VST1 and VST2 together with three horizontal members VHK1, VHK2 and VHK3. Cross-bar switches of the type are known per se. Each of the vertical switch rods has two contact elements which are connected via contacts *vh*1 and *vh*2 to the wires of the junction paths 1 and 2. Each of the horizontal elements of the cross-bar switch has two contact means which are connected to the *a* and *b* wires of the lines leading to the subscribers' stations. The switch rods VST1 and VST2 can be raised by lifting magnets VH1 and VH2 respectively, each having a low-ohmic coil shown in heavy lines and a high-ohmic coil shown in thin lines. On being raised, the switch rod VST1 operates the related contacts *vh*1/1, *vh*1/2, *vh*1/3 and *vh*1/4. Similarly the switch rod VST2 on being raised operates the related contacts *vh*1/1, *vh*2/2, *vh*2/3 and *vh*2/4. Each of the horizontal members VHK1, VHK2 and VHK3 may be horizontally displaced by means of an electromagnet VT1, VT2 and VT3 respectively against the action of a spring (not shown). Thereby the member VHK1 operates the associated contacts *vt*1/1, *vt*1/2 and *vt*1/3. Similarly the members VHK2 and VHK3 operate the associated contacts *vt*2/1, *vt*2/2, *vt*2/3 and *vt*3/1, *vt*3/2, *vt*3/3 respectively. In order to effect a switching-through between one of said rods and one of the horizontal members, the respective switch rod must first be raised, the respective horizontal member be displaced against the action of the spring, and finally the raised switch rod be allowed to fall back. In switching-through, the contact wires of the horizontal contact member engaged by the switch rod are displaced further and operate by means of a transmission rod the disconnecting contacts *vtr*1/1 and *vtr*1/2, *vtr*2/1 and *vtr*2/2, *vtr*3/1 and *vtr*3/2 respectively. On cutting out the electromagnet of the horizontal member, same is restored to normal under the action of the related spring the contact wires engaged by the switch rod remaining in the operative position until the connection is interrupted by a fresh raising of the switch rod.

Figure 3:
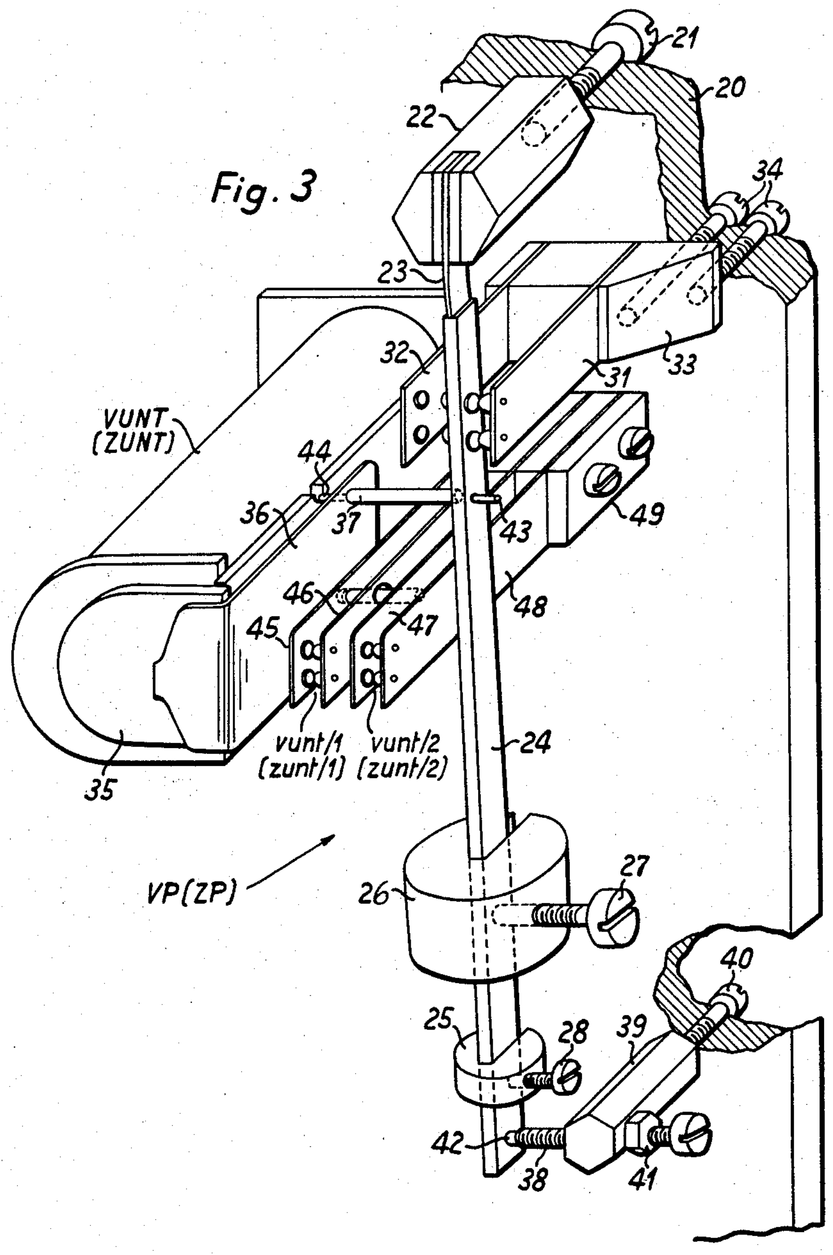
Fig. 3 is a diagrammatic view in perspective of a pendulum commutator such as is found in the two switch apparatus according to the invention.

The switch apparatus V further comprises a pendulum commutator VP, the constructional design of which can be seen from Fig. 3. Attached by a screw 21 on a vertical mounting plate 20 of electrically insulating material is a holder 22. The latter has inserted in it a flexible end portion 23 of a pendulum 24 which is provided with two weights 25 and 26 secured thereto by means of clamping screws 27 and 28 respectively. By displacing the weights 25 and 26, with screws 27 and 28 loosened, the frequency of the freely oscillating pendulum 24 may be varied and tuned to a desired value. The pendulum 24 is situated between two contact springs 31 and 32 which are fixed and electrically insulated from each other on a block which in turn is arranged on the mounting plate 20 by means of screws 34. When the pendulum oscillates to and fro it alternately makes electric contact with one or other of the contact springs 31 and 32.

Moreover, said plate 20 has mounted thereon an electromagnet VUNT with a pivotal armature 35 arranged thereon in a conventional manner, which armature is rigid with an operating arm 36. A spring (not shown) tends to keep the armature 35 away from the magnet and thus to move the arm 36 in Fig. 3 to the left. In Fig. 3 the magnet is shown as energized. Then, by means of a coupling pin 37, said operating arm 36 presses the pendulum 24 to the right against an adjustable stop formed by a screw 38. The latter engages a suitable threaded bore of a holder 39 mounted on the plate 20 by means of a screw 40. A nut 41 serves to secure the screw 38 in the adjusted position. The end of the screw 38 facing the pendulum is provided with an elastically resilient buffer 42 of, say, rubber. The coupling pin 37 has at its both ends thinner extensions 43 and 44 which pass with radial clearance through bores on pendulum 24 and arm (or lever) 36 and do not slide out thereof, even if the magnet VUNT is de-energized and the pendulum 24 swings freely to and fro.

The electromagnet VUNT is further provided with relay contacts *vunt*/1 and *vunt*/2 which are closed when the magnets are energized. As in the case of a relay, these contacts are formed by contact springs 45, 46, 47 and 48 which are electrically insulated from each other and arranged on a block 49. For energizing the electromagnet VUNT, this element is furnished with two coils, of which one, low-ohmic, is shown in heavy lines in Fig. 1, while the other, high-ohmic, is shown in thin lines in Fig. 1.

Furthermore, the switch apparatus V includes several relays VSE, VA, VSP, VANL, VTN1, VTN2, VTN3, VU1, VU2 and VEP, the coils of which are designated with the said capital letters and numerals. The contacts belonging to these relays are denoted by the corresponding small letters and the same numerals, the single contacts of the same relay being further distinguished from each other by additional numerals. The coils of the relays VU1 and VU2 are each joined via an electric valve VE1 and VE2 respectively to the *a* wire and *b* wire connected to the switch rod VST1 and VST2 respectively, The relay VSP has delayed release.

The apparatus V finally comprises a pulse transformer VT, a condenser VC1 and a choke or coil VDR. As sole source of potential in the switch apparatus V there is provided a condenser VC, the two poles of which, designated + and —, are joined to all similarly designated conductors within the apparatus V. For the sake of clarity these connections are not indicated in Fig. 1. The plus-pole of the condenser VC is grounded. The interconnection of the parts mentioned of the apparatus V can be seen from Fig. 1 and from the subsequent description of the method of working of the system.

The second switch apparatus Z (Fig. 2) is of similar design. It also includes a cross-bar switch, wherein, however, the vertical switch rods ZST1 and ZST2 as well as the horizontal members ZHK1, ZHK2 and ZHK3 have each three conducting elements *a*, *b*, *c* electrically insulated from each other. For raising the vertical rods, there are provided lifting magnets ZH1 and ZH2, each having a low-ohmic coil shown in heavy lines, and a high-ohmic coil shown in thin lines. On raising the switch rod ZST1, the contacts *zh*1/1, *zh*1/2 . . . *zh*1/5 will be operated, and on raising the rod ZST2 the contacts *zh*2/1, *zh*2/2 . . . *zh*2/5. For displacing the horizontal members of the cross-bar switch against the action of resetting springs (not shown), there are provided electromagnets ZT1, ZT2 and ZT3. The horizontal members themselves respectively actuate the related contacts *zt*1/1, *zt*1/2, *zt*1/3 and *zt*2/1, *zt*2/2, *zt*2/3 and *zt*3/1, *zt*3/2, *zt*3/3. The horizontal members ZHK1, ZHK2 and ZHK3 are joined to the exchange connections T*a*1, T*a*2 and T*a*3, whereas the *a* and *b* conductors of the vertical switch rods ZST1 and ZST2 are respectively connected via contacts *zh*1/1, *zb*1/1, and *zh*1/2, *zb*1/2 or *zh*2/1, *zb*2/1 and *zh*2/2, *zb*2/2 to the two-wire junction paths 1 and 2.

The switch apparatus Z also contains a pendulum commutator ZP, the structural design of which is identical with that described in detail according to Fig. 3. The pendulum of the commutator ZP can be caused to deflect to one side by an electromagnet which, according to Fig. 2, has a low-ohmic coil shown in heavy lines, and a high-ohmic coil indicated with thin lines. Relay contacts operable by the same magnet ZUNT are designated *zunt*/1 and *zunt*/2. The pendulums 24 of the pendulum commutators VP and ZP in the two switch apparatus V and Z are tuned to the same oscillation frequency.

The apparatus Z comprises moreover several relays ZANS, ZEP, ZSE, ZANL, ZTN1, ZTN2, ZTN3, ZA, ZB2, ZBS1 and ZBS2, the coils of which, in Fig. 2, are designated with the said letters and numerals. The contacts belonging to these relays are denoted by the corresponding small letters and the same numerals, the single contacts of the same relay being in addition distinguished from each other by additional numerals. The relays ZBS1 and ZB2 have delayed release. The relays ZB1 and ZB2 are associated with the junction path 1, and the relays ZB2 and ZBS2 with the other junction path 2.

The apparatus Z finally also includes a pulse transformer ZT, a condenser ZC1 and a choke or coil ZDR. As source of electric current, there is a battery B, the two poles of which are connected to all conductors designated + or — within the apparatus Z. For the sake of clarity these connections are not indicated in Fig. 2. The + pole of the battery B is earthed and thus connected via ground to the + pole of the condenser VC in the apparatus V (Fig. 1). The interconnection of the mentioned parts of the apparatus Z can be seen from Fig. 2 and from the following description of the method of working of the system.

The exchange A may be of any known type. It contains a battery (not shown) which, if necessary, could be identical with the battery B, together with means adapted in known manner to make the *c* conductors of the connections T*a*1, T*a*2 and T*a*3 negative with respect to ground, if no call comes in from the exchange, and to make them positive, if the respective connection is engaged.

The action of the aforedescribed telephone intercommunication system is as follows:

When starting operation of the system, in the apparatus Z each vertical switch rod ZST should be electrically connected to a vertical member ZHK of the cross-bar switch.

In case no call is coming from the exchange, the *c* wires of the exchange connections T*a*1, T*a*2 and T*a*3 are negative with respect to earth. The relays ZBS1 and ZBS2 are energized. The contacts *zbs*1/1 and *zbs*2/1 are changed-over with respect to what is shown in the drawing. From the exchange A, the wire *a* of each junction path 1 or 2 receives plus potential and the wire *b* of each junction path receives minus potential.

Insertion of the battery B in the apparatus Z1 will cause the relay ZB1 to pull up via contacts *zh*1/5, *zh*2/5, *zans*/1 and *zbs*1/1 and thus the contacts *zb*1/1 and *zb*1/2 change-over. Thereby the potential on the *a* and *b* wires is reversed in polarisation. The relay VU1 in the apparatus V, connected in series with a valve VE1, will be energized. Its contact *vu*1/1 connects up the *a* wire to the condenser VC which becomes charged. This condenser serves for feeding the switch apparatus V which otherwise contains no battery. As soon as VC is loaded, the high-ohmic relay VSP pulls up, through the low-ohmic coil of the lifting magnet VH1, contacts *vh*1/3 and *vu*1/2. The contact *vsp*/1 bridges the coil of the relay VSP, thus causing energizing of the low-ohmic coil of the lifting magnet VH1 and raising of the switch rod VST1. The relay falls back with time-lag so that its contacts at first still remain closed.

Raising of the switch rod VST1 causes operation of the contacts *vh*1/1 to *vh*1/4. The contact vh1/3 changes-over, in order that the lifting magnet VH1 remains energized through its two coils now put in series and the contacts *vh*1/3 and *vep*/1, if the contact *vsp*/1 opens later. One coil of the electromagnet VUNT becomes energized through the contacts *vh*1/4 and *vsp*/2 of the still unreleased relay VSP. The magnet VUNT causes the pendulum of the commutator VP to move to the right and remains energized by means of its other coil through the contacts *vunt*1 and *van*1/1, if now the relay VSP falls back and its contact *vsp*/1 opens. The relay VS pulls up through the contact *vunt*/2 and one contact of the pendulum commutator, thus actuating the contacts *va*/1 to *va*/4.

Raising of the switch rod VST1 causes the contacts *vh*1/1 and *vh*1/2 to change-over, and causes the relay VU1 to fall back, and energizing of the relay ZANS in the apparatus Z. Through the contact *zans*/2, the low-ohmic coil of the lifting magnet ZH becomes energized, thus also causing the switch rod ZST1 to rise which in turn operates the contacts *zh*1/1 to *zh*1/5. Through the change-over of the contact *zh*1/3 for retention of the switch rod ZST, the high-ohmic coil of the magnet ZH1 is put in series with its low-ohmic coil. Through the contacts *zh*1/3 and *zep*/1 a second circuit is inserted, in order that the switch rod ZST1 remains raised if the contact *zb*1/3 opens later. One coil of the electromagnet ZUNT receives potential through the contacts *zans*/3 and *zh*1/4, thus causing the pendulum of the commutator ZP to move to the right. The contact *zunt*/1 connects up the other coil of the magnet ZUNT, in order that the latter remains energized if the contact *zans*/3 opens later. The relay ZA is energized via contact *zunt*/2 and one contact of the pendulum commutator ZP, whereby the contacts *za*/1 to *za*/4 are operated. The contact *zb*1/5 causes the relay ZB1 to fall back. The contacts *zb*1/1 and *zb*1/2 change-over, whereupon also the relay ZANS falls back. The condenser VC is then fed over the *a* wire as well as the *b* wire of the line 1. On raising the switch rod ZST1, the circuits to the relays ZBS1 and ZB1 are interrupted; therefore these relays fall back. The contact *zbs*1/1 prepares a circuit to the relay ZB2 which, however, cannot yet be energized since the switch rod contact *zh*1/5 is kept open by the raised rod ZST1. The system is now ready for a switching-through.

If a subscriber, say, T*e*2, is called by the exchange A, his *c* conductor receives + potential and the subscriber's relay ZTN2 pulls up. The contact *ztn*2/1 is closed and effects via closed contact *za*/2 the energizing of the transmitting relay ZSE, the contact *zse*/1 of which is changed-over. The condenser ZC1, which prior to actuation of the contact *zse*/1 was connected to the battery B, discharges through the choke or coil ZD*r* in the transformer ZT. As a result there is a damped oscillation in this oscillating circuit. This oscillating pulse is transmitted via junction path 1 also to the switch apparatus V and causes the relays ZEP and VEP to pull up, which change-over their contacts *zep*/1 and *vep*/1 respectively. The contacts *za*/3 and *va*/3 being closed, the holding circuits of the lifting magnets ZH1 and VH1 are not interrupted, and the switch rods ZST1 and ZST2 do not fall back. The relays ZANL and VANL are energized through the closed contacts *za*/4 and *va*/4 respectively and open with their contacts *zan*1/1 and *van*1/1 respectively the holding circuit of the electromagnets ZUNT and VUNT. Thus the pendulums of both commutators ZP and VP oscillate freely and synchronously, at first to the left, feed with their contact through the preparing closed contacts *za*/1 and *va*/1 the coils ZT1 and VT1 respectively, which attract the horizontal members ZHK1 and VHK of the cross-bar switch in both apparatus Z and V and then remain energized through the proper contacts *zt*1/1 and *vt*1/1 respectively. The relays ZA and VA fall back and their contacts become inoperative. The relay ZSE falls back by the opening of contact *za*/2. The contacts *zt*1/2 and *vt*1/2 prepare the energizing of the coils ZT2 and VT2 respectively. The pendulums then oscillate to the right, interrupt thereby the circuit of the coils ZT1 and VT1 and cause the coils ZT2 and VT2 to be energized, which actuate the members VH2 and ZH2 and then remain energized across their proper contacts *zt*2/1 and *vt*2/1 respectively. The contacts *zt*2/3 and *vt*2/3 change-over. In the apparatus Z the transmitting relay ZSE is then re-energized via contact *zt*2/3 and then via contact *ztn*2/1, closed by the call. The relay ZSE sends through its contact *zse*/1 a second oscillating pulse. Thereby the relays ZEP and VEP are re-energized and interrupt through their contacts *zep*/1 and *vep*/1 the circuit of the lifting magnets ZH1 and VH1, as the contacts *za*/3 and *va*/3 have been open since the release of the relays ZA and VA. Incidentally the switch rods ZST1 and VST1 drop, the electric contact being established with the attracted horizontal members ZHK2 and VHK2. With the drop of the rods ZST1 and VST1, the contacts *zh*1/1, *zh*1/2 and *vh*1/1, *vh*1/2 respectively become inoperative. Thus the desired switching-through is established.

Thereupon the system is ready for another switching-through. Since the *c* wire of the engaged subscriber T*e*2 receives the + potential from the exchange, the relay ZBS1 is not re-energized when line 1 is switched through. But in the event of the junction path 2 being free, the relay ZBS2 pulls up. The relay ZB2 consequently pulls up through the contacts *zh*1/5 (*zh*1/5 was closed with switch rod ZST1 falling back), *zh*2/5, *zans*/1, *zbs*1/1 and *zbs*2/1 and effects the lift of the rods VST2 and ZST2 in a similar way as described above for the lift of the switch rods VST1 and ZST1. At a next call the junction path 2 will then be switched through.

If a subscriber T*e*1 . . . T*e*3 lifts his receiver, the associated VTN relay in the apparatus V pulls up, and thus causes energizing of the transmitting relay VSE. The further operations then proceed as disclosed hereinbefore.

In most practical cases the system will be provided for more than three subscribers' stations and for more than two junction paths. But the number of the junction paths between the two automatic switch apparatus will always be less than the number of the subscribers' stations connected to one switch apparatus.

What I claim is:

1. A telephone system for coupling an exchange with subscribers' stations comprising first and second switching devices respectively coupled to said exchange and said stations and coupling lines in a number which is less than the number of stations for coupling said switching devices, said switching devices selecting a station for receiving a call and transmitting signals from one of said stations to said exchange via an available one of said lines; said switching devices each comprising switches operatively associated with each other for coupling a station and the exchange and adapted for sequential operation to select an available line, switch means for selectively energizing said switches, a mechanical oscillating device operatively associated with said switch means for controlling the same, and a locking device operatively associated with said oscillating device to prevent oscillation of the same and responsive to an electrical signal for releasing said oscillating device for oscillation of the same to control the operation of said switches.

2. A system as claimed in claim 1, wherein the oscillating device is a pendulum and said switch means comprises contacts positioned adjacent the pendulum for being closed by predetermined oscillations of said pendulum; said system further comprising a source of power coupled to the pendulum for supplying power to the switches.

3. A system as claimed in claim 1 comprising adjustment means coupled to the oscillating device for controlling the oscillator parameters thereof.

4. A system as claimed in claim 1 comprising a source of electrical pulses in one of said switching means, said source being coupled selectively to said lines by said switches.

5. A system as claimed in claim 1 comprising a source of electrical power in one of said switching devices and a power storage device in the other of said switching devices coupled via said lines to said source, the switches being electromagnetic devices coupled to the source and being operated by the power supplied thereby.

6. A system as claimed in claim 1 wherein the locking device is an electromagnet.

References Cited in the file of this patent

UNITED STATES PATENTS

| | | |
|---|---|---|
| 2,037,221 | Evers | Apr. 14, 1936 |
| 2,057,868 | Wochinger | Oct. 20, 1936 |
| 2,068,726 | Wochinger | Jan. 26, 1937 |
| 2,244,920 | Post | June 10, 1941 |
| 2,258,853 | Jauch | Oct. 14, 1941 |
| 2,402,446 | Powell | June 18, 1946 |
| 2,542,079 | Grundin et al. | Feb. 20, 1951 |
| 2,787,667 | Mauge et al. | Apr. 2, 1957 |